J. M. GARNETT.
Cultivator Teeth.
No. 14. A. I. Patented Oct. 13, 1838.
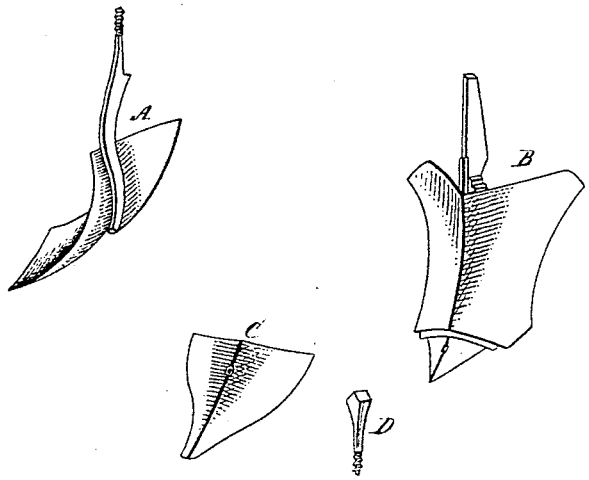
AM. PHOTO-LITHO. CO. N.Y. (OSBORNE'S PROCESS.)

UNITED STATES PATENT OFFICE.

JAMES M. GARNETT, OF LORETTO, VIRGINIA.

IMPROVEMENT IN THE DOUBLE-MOLD-BOARD-PLOW IRON.

Specification forming part of Letters Patent dated February 3, 1836; Additional Improvement No. 14, dated October 3, 1838.

*To all whom it may concern:*

Be it known that I, JAMES M. GARNETT, of Loretto, county of Essex, and State of Virginia, have invented a new improvement in the irons of the echelon cultivator, and a new form and mode of attaching a cast-iron point to a double-mold-board-plow iron; and I do hereby declare that the following is a full and exact description.

It consists of two castings. The first is similar in form to that of the echelon cultivator, but differs materially in the shape of its wrought-iron shank or leg, and in the manner of attaching the two together, the former being by two grooves curved and dovetailed, the latter by a single plain groove, which is straight, both in the bottom and sides, in which the shank is fastened by a short square-headed bolt countersunk in the center of the concave side of the casting. All this is represented by the accompanying drawing marked A. The other casting resembles in form a double-mold-board-plow iron, represented by the drawing marked B, but differs from the only one I ever saw in the form, material, and fixing on its point. The manner of attaching the plow-iron to the frame is also different. The form of its cast-iron point is shown by the drawing marked C, and the drawing D represents the square-headed bolt raised across the center, by which the point C is fastened to the iron B. This iron, with its point attached, is fixed in the hindmost end of the central beam of a triangular frame, the two sides of which diverge to the right and left from the point of fixture. In the right side are fastened two irons, like the drawing A, and in the left side two others, precisely similar, except that they are made to turn the furrow to the left instead of the right. The furrows opened by the two first are filled by the two next, and these last by the double-mold-board-plow iron, so that only one furrow in five is left open, whereas all are left open by every other cultivator (except one) that I have ever seen. This will more fully appear by one of mine which I have deposited in the Patent Office.

The advantage of this implement over the echelon cultivator is, that with two horses or mules it performs double the work in half the time, and saves the labor of one plowman. It is designed for the culture of corn, cotton, or any other crop planted in straight rows, and for seeding small grain in land previously well plowed.

What I claim as my invention, and desire to secure by Letters Patent, is—

The removable point on the double-mold-board-plow iron, and the mode of attaching the two together.

January 11, 1838.

JAMES M. GARNETT.

Witnesses:

M. H. GARNETT,

E. L. GARNETT.